United States Patent [19]

Billet et al.

[11] Patent Number: 4,635,776
[45] Date of Patent: Jan. 13, 1987

[54] CLUTCH HAVING A STARTER RING GEAR AND AN IGNITION TIMING MARK

[75] Inventors: René Billet, Lamorlaye; Michel Bacher, Garges-les-Gonesse, both of France

[73] Assignee: Valeo, Paris, France

[21] Appl. No.: 489,802

[22] Filed: Apr. 29, 1983

[30] Foreign Application Priority Data

Apr. 29, 1982 [FR] France ................................ 82 07393

[51] Int. Cl.[4] .............................................. F16D 13/58
[52] U.S. Cl. ..................................... 192/70.27; 74/572
[58] Field of Search ........................... 192/70.27, 89 B; 123/414; 74/572, 449

[56] References Cited

U.S. PATENT DOCUMENTS

| 2,018,834 | 10/1935 | Church | 192/70.27 |
|---|---|---|---|
| 2,694,478 | 11/1954 | Zeidler | 192/70.18 |
| 2,724,975 | 11/1955 | Drummond | 74/449 |
| 2,729,110 | 1/1956 | Killian et al. | 74/449 |
| 2,835,141 | 5/1958 | DeLorean | 74/572 |
| 2,982,150 | 5/1961 | Kolbe | 74/572 |
| 3,128,639 | 4/1964 | Hein et al. | 74/572 |
| 4,181,884 | 1/1980 | Shirasaki et al. | 123/414 |
| 4,355,613 | 10/1982 | Rode et al. | 123/414 |
| 4,365,602 | 12/1982 | Stiller et al. | 123/414 |
| 4,445,601 | 5/1984 | Hofbauer et al. | 192/89 B |
| 4,493,409 | 1/1985 | Steeg | 192/70.13 |

FOREIGN PATENT DOCUMENTS

| 1281320 | 12/1961 | France . | |
|---|---|---|---|
| 80137 | 2/1963 | France | 192/70.18 |
| 2365036 | 4/1978 | France . | |

Primary Examiner—Rodney H. Bonck
Assistant Examiner—Richard M. Lorence
Attorney, Agent, or Firm—Charles E. Brown; Charles A. Brown

[57] ABSTRACT

An automotive clutch comprises a single support ring for carrying a starter ring gear and an ignition timing mark. The support ring comprises a radial portion and an axial portion the latter of which carries both the starter ring gear and the ignition timing mark. The axial portion may have two separate axial sections radially offset relative to each other, with the greater diameter axial section remote from the radial portion and a smaller diameter axial section relatively adjacent to the radial portion.

8 Claims, 3 Drawing Figures

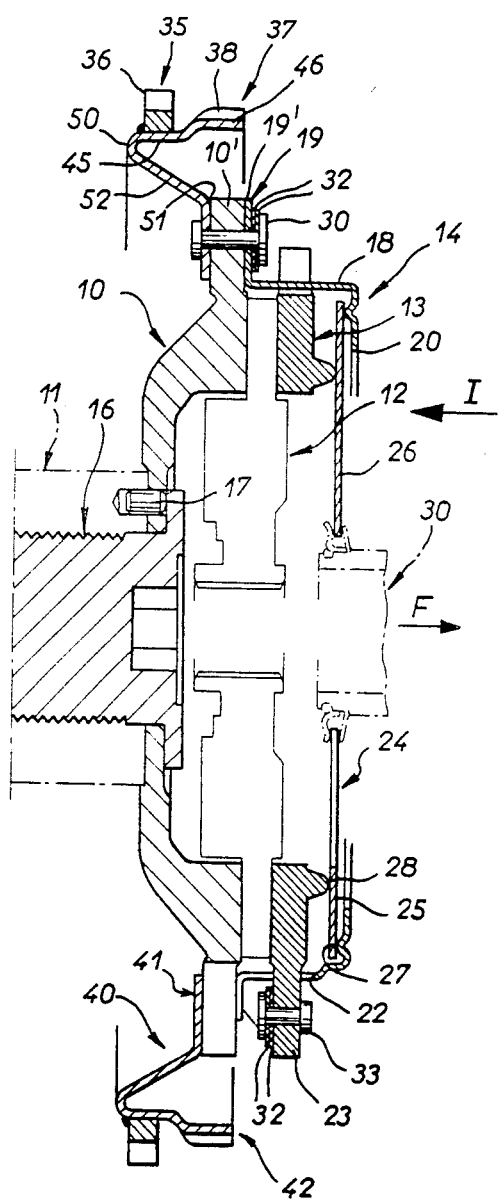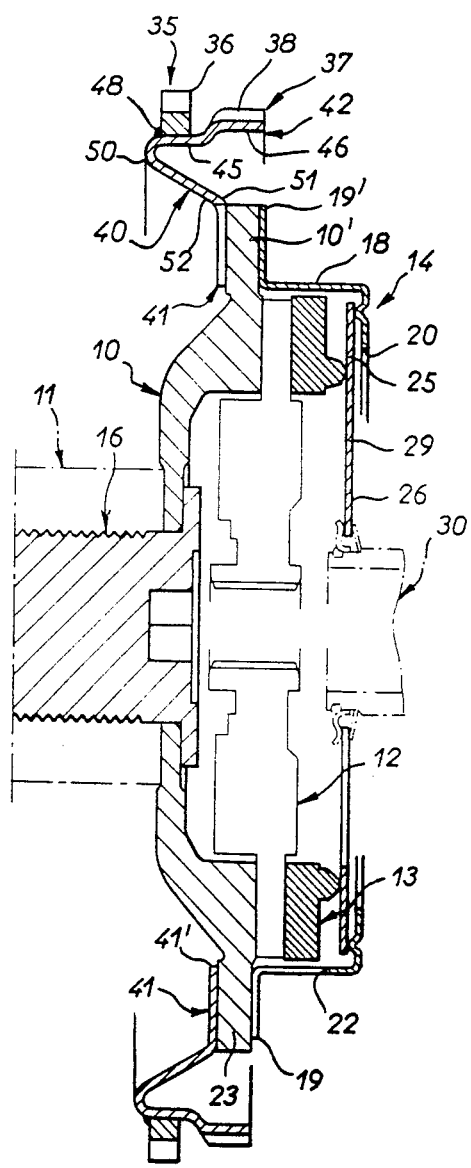

CLUTCH HAVING A STARTER RING GEAR AND AN IGNITION TIMING MARK

BACKGROUND OF THE INVENTION

The present invention relates generally to clutches of the type usually equipping motor vehicles.

As is well known such automotive clutches essentially comprise a reaction plate or flywheel adapted to be secured by fastening means to a first shaft, in practice a driving shaft, which is the engine output shaft in the case of a motor vehicle, a friction disc or clutch plate adapted to be fixed for rotation with a second shaft, in practice a driven shaft, which is most often the input shaft of a transmission in the case of a motor vehicle.

Such clutches further comprise a second plate known as a pressure plate fixed for rotation with the reaction plate or flywheel and axially movable with respect to the latter and a cover fixed axially to and for rotation with the flywheel. Resilient means bearing on the cover constantly urge the pressure plate toward the flywheel for squeezing or clamping the clutch plate between the pressure plate and the flywheel.

As is also well known such clutches are usually provided with a starter ring gear. Most often the starter ring gear is carried directly by the flywheel or is formed in one-piece therewith. Alternatively the starter ring gear may be formed as a part separate from the flywheel in which case it may be formed for example by rolling into a ring an initially straight bar and suitably securing it to the flywheel.

DESCRIPTION OF PRIOR ART

Nevertheless it has already been proposed, notably in French certificate of addition No. 80,137 issued Feb. 4, 1963, to have the starter ring gear carried by a support ring and to secure the starter ring gear on the flywheel by the medium of such a support ring. In practice, such a support ring is of L-shaped cross-section and comprises an inner peripheral radial portion which is adapted to be suitably secured to the flywheel and an outer peripheral axial portion which supports the starter ring gear.

The present invention is more particularly directed to the case where an ignition timing mark means is also provided for cooperation with a suitable fixed timing probe or sensor. Most often the ignition timing mark means is also carried by the flywheel. Alternatively it has already been proposed notably in French patent publication No. 2,365,036 to form on the cover an ignition timing mark means.

In any event up to the present the starter ring gear and the ignition timing mark means have been systematically dissociated from each other particularly because they are members which must comply with different manufacturing constraints: though it is possible to satisfy the relatively large manufacturing tolerances for the starter ring gear which is the reason why it may be formed by rolling a previously straight bar, such is not the case with the ignition timing mark means which on the contrary must satisfy very high precision requirements.

There usually results a relatively complex manufacturing precedure for the entire unit, namely as regards the fastening means adapted to secure the starter ring gear and the ignition timing marker means on either one of the components of the clutch.

SUMMARY OF THE INVENTION

A general object of the invention is the provision of an arrangement which goes against prejudices in this field and which simplifies the manufacture and provides other advantages.

A more specific object of the invention is the provision of an automotive clutch of the type having a starter ring gear and an ignition timing mark means which is characterized by the starter ring gear and the ignition timing mark means both being carried by the same annular support ring.

According to the invention the support ring carries a part which complies with the relatively precise manufacturing constraints and the other part may be satisfied by less precise manufacturing constraints.

Yet, preferably, to satisfactorily reconcile these apparently contradictory exigencies, particular measures are taken for this support ring.

According to one of these measures the annular support ring generally comprises an inner peripheral radial portion and an outer peripheral axial portion, the radial portion being adapted to be suitably secured to one of the component parts of the clutch and the axial portion carrying both the starter ring gear and the ignition timing mark means, and a connecting zone between the inner and outer peripheral portions which is oblique with respect to the axis of the clutch and makes an angle less than 90° with the axial portion.

Thus stiffened by an acute angle bend in the vicinity of the axial portion, the annular support ring is better adapted to the manufacturing constraints which the ignition timing mark means must satisfy and is perfectly well adapted to carry, in a suitable manner, the starter ring gear.

According to a preferred embodiment the axial portion of the annular support ring comprises two separate sections radially offset relative to each other, one of the sections carrying the starter ring gear and the other carrying the ignition timing mark means. Thus the starter ring gear and the ignition timing mark means are substantially separated from each other so that the support ring may easily satisfy the manufacturing constraints with which each must comply.

In any event since a single support ring carries the starter ring gear and the ignition timing mark means the construction of the entire clutch is advantageously simplified and its weight and therefore its inertia and its cost are also reduced.

These and other features and advantages of the invention will be brought out in the description which follows, given by way of example with reference to the accompanying diagrammatic drawings.

BRIEF DESCRIPTION OF THE DRAWINGS

FIG. 2 is a cross-sectional view taken along broken line II—II in FIG. 1; and

FIG. 3 is another cross-sectional view taken along broken line III—III in FIG. 1.

DESCRIPTION OF THE PREFERRED EMBODIMENT

Figure 1:
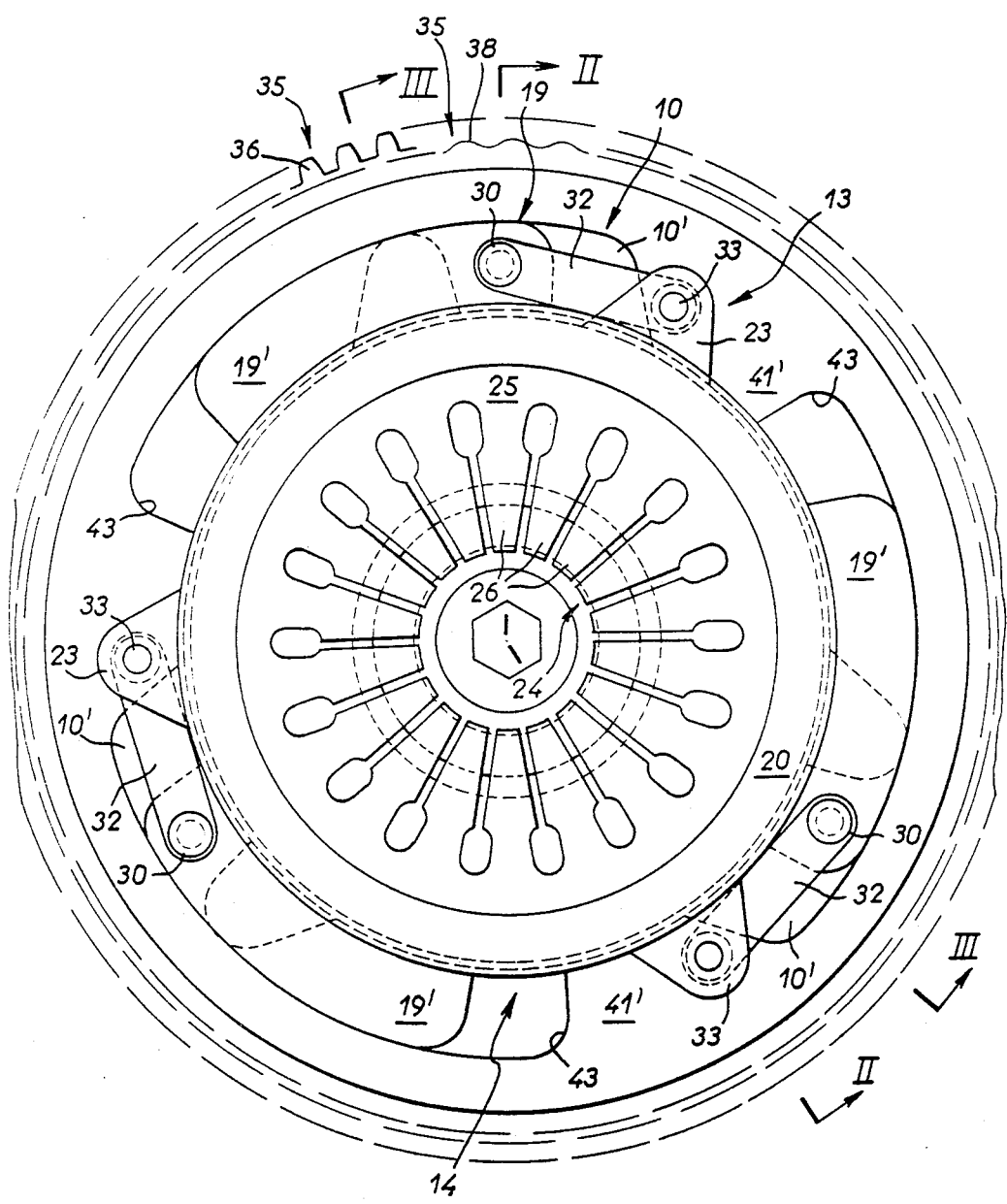
FIG. 1 is a partly cutaway elevational view of a clutch embodying the invention, taken in the direction of arrow I in FIG. 2.

Generally speaking, and as illustrated in the drawings, the clutch comprises, in axial succession, in a manner known per se, a reaction plate or flywheel 10 adapted to be fixed to a first shaft 11 schematically shown in chain-dotted lines in FIGS. 2 and 3, a clutch disc or clutch plate 12 adapted to be fixed to a second shaft (not shown in the drawings). Next, there is a pressure plate 13 fixed for rotation with the flywheel 10 though axially displaceable with respect to the flywheel, and a cover 14 fixed axially to and for rotation with the flywheel 10. Resilient means described in greater detail below bear against the cover 14 and constantly urge the pressure plate 13 toward the flywheel 10 for axially squeezing or clamping the clutch plate 12 between the pressure plate 13 and the flywheel 10.

In practice the first shaft 11 is the driving shaft. As the clutch is adapted for a motor vehicle, the first shaft is the driving shaft or crankshaft of the vehicle.

In the illustrated embodiment shown in the drawings, the flywheel 10 is of one-piece construction and by the medium of the flywheel the clutch of which it is a part is secured to the end of a driving shaft 11 by a single axial bolt 16, and between the flywheel and the driving shaft 11 is at least one axial centering or indexing pilot 17.

In any case the part which forms the flywheel is of generally annular configuration. Nevertheless, in the illustrated embodiment the flywheel 10 has at its outer periphery three uniformly circumferentially spaced radial lugs 10'.

The cover 14 is likewise of generally annular configuration. As illustrated the cover 14 has at one axial end of its generally cylindrical or frustoconical sidewall 18 a radially outwardly extending flange 19 by which the cover is secured to the flywheel 10 as will be described in greater detail below and at the other axial end a radially inwardly directed rim 20 which defines a fulcrum for the resilient means biasing the pressure plate 13 toward the flywheel 10.

In the illustrated embodiment the radial flange 19 of the cover 14 is generally divided circularly into a plurality of separate sectors 19' which are uniformly circumferentially spaced from one another and three in number as shown. In addition, between consecutive flange sectors 19' the sidewall of the cover 14 is largely open along the greater part of its axial length through cutouts 22.

The pressure plate 13 is also of generally annular configuration. It has circumferentially spaced, radially outwardly projecting lugs 23 which are three in number in the illustrated embodiment, and extend radially through the cutouts 22 in the sidewall 18 of the cover 14.

In the illustrated embodiment the resilient means biasing the pressure 13 also comprise a part of generally annular configuration known as a diaphragm spring which comprises a Belleville washer outer peripheral portion and a central portion divided into radial fingers. The Belleville washer peripheral portion 25 of the diaphragm spring 24 bears against an annular bead 27 axially projecting from the radial rim 20 of the cover and bears against a bead 28 on the pressure plate 13 which may be divided into a circumferential segments and which protrudes axially from the pressure plate.

The ends of the radial fingers 26 of the diaphragm spring 24 are adapted to cooperate with a clutch release bearing 30 schematically illustrated in chain-dotted lines in FIGS. 2 and 3. In the illustrated embodiment the clutch release bearing is of the pull type, that is to say, it operates in the direction away from the flywheel 10 as schematically represented by arrow F in FIG. 2.

Consequently the diameter of the circumference along which the bead 27 is formed on the cover 14 for contact with the diaphragm spring 24 is greater than that of the circumference along which extends the bead 28 on the pressure plate 13 for contact with the diaphragm spring 24.

In the illustrated embodiment the fastening means for axially securing the cover 14 to flywheel 10 for rotation comprises three rivets 30, each of the rivets 30 being disposed axially between a sector 19' of the radial flange 19 of the cover 14 and the corresponding radial lug 10' of the flywheel 10. In actual practice, as illustrated, rivets 30 are used for fixing resiliently deformable straps 32 usually provided for fixing the pressure plate 13 for rotation with the cover 14 and thereby with the flywheel 10. The resiliently deformable straps 32 are arranged in pairs in the illustrated embodiment, extending generally chordally of the clutch assembly, and are attached at their other ends by rivets 33 to the radial lugs 33 on the pressure plate 13. Thus it will be noted that in the illustrated embodiment the resiliently deformable straps 32 bear against surface of the radial flange 19 of the cover 14 facing opposite that of the flywheel 10. Further, since the straps 32 are to constantly bias the pressure plate 13 away from the flywheel 10 they have a camber with respect to which they are permanently biased in compression for constantly biasing the pressure plate 13.

The foregoing arrangements which are for the most part known per se, are not part of the present invention per se and therefore need not be described in greater detail herein.

Likewise the clutch plate 12 is only schematically represented in chain-dotted lines by its outline in FIGS. 2 and 3.

Also as is known per se the clutch comprises a starter ring gear 35 having teeth 36 and an ignition timing mark means 37 comprising teeth 38.

According to the invention the starter ring gear 35 and the ignition time mark means 37 are both carried by the same annular support ring 40.

In the illustrated embodiment the annular support ring 40 comprises at its inner periphery a radial portion 41 by which the support ring is adapted to be suitably secured to any one of the component parts of the clutch, which in the illustrated embodiment is the flywheel 10, and at its outer periphery an axial portion 42 which carries the starter ring gear 35 and the ignition timing mark means 37.

In practice, and as illustrated, and for reasons which go beyond the present invention and therefore will not be developed herein, the radial portion 41 of the annular support ring 40 which extends generally transversely with respect to the axis of the clutch assembly is divided circumferentially into separate sectors 41' which are uniformly spaced from each other and three in number, and the cutouts 43 which alternate with the sectors 41' are similar to the sectors 19' of the radial flange 19 of the cover 14, and slightly circumferentially offset with respect to the same.

According to a feature of the invention the axial portion 42 of the annular support ring 40 comprises two separate axial sections 45 radially offset with respect to each other, one of the sections carrying the starter ring gear 35 and the other of the sections carrying the ignition timing mark means 37.

In the illustrated embodiment the section 46 which is located at the free end of the axial portion 42 remote from the radial portion is the larger diameter section. Further, in the embodiment, the axial section of the larger diameter 46 carries the ignition timing mark means 37. In practice, as shown the ignition timing mark means 37 is an integral part of the support ring 40, the teeth 38 of the ignition timing mark means 37 being formed in the wall of the support ring 40 by the appropriate deformation thereof and more particularly by the appropriate deformation of the larger diameter section 46 of the axial portion 42.

In conjunction with this arrangement, in the illustrated embodiment, the starter ring gear 35 is formed as a separate part made by rolling an initially straight bar. The separate part is then secured to the support ring 40 by welding and more particularly along the smaller diameter section 45 of the axial portion 42 of the support ring 40. Preferably, as shown, the corresponding welding zone 48 extends exclusively to the side of the starter ring gear 35 axially remote from the ignition timing marker means 37 for protecting the latter.

According to the invention, between the radial portion 41 and the axial portion 42 is a connecting zone 52 which is generally oblique with respect to the axis of the clutch assembly and makes an angle of less than 90° with respect to the axial portion. In other words, the angle of the bend 50 that the axial portion 42 makes with the connecting zone 52 is an acute angle. On the other hand, the angle of the bend 51 which the connecting zone 52 makes with the radial portion 41, in the opposite direction, is an obtuse angle.

This arrangement ensures the stiffening of the support ring 40.

Finally, in the illustrated embodiment, the support ring 40 is fixed to the flywheel 10, and more particularly, to the radial lugs 10' at the outer periphery thereof by the same fastening means that secure the cover 14 to the flywheel, i.e., rivets 30.

Further, in the illustrated embodiment, the corresponding radial portion 41 is disposed on the side of the radial lugs 10' of the flywheel 10 opposite the side on which the radial flange 19 of the cover 14 is formed.

The present invention is not intended to be limited to the illustrated and described embodiment but on the contrary is intended to encompass all modifications and variations understood to those skilled in the art without departing from the scope of the appended claims.

In particular, instead of being secured to the flywheel the support ring carrying both the starter ring gear and the ignition timing mark may be secured to another component part of the clutch, for example, the cover.

When the support ring is mounted on the flywheel the radial portion thereof may be inserted between the flywheel and the cover instead of being secured to the face of the flywheel opposite the cover.

Further, the support ring may also being secured by crimping to the part which carries it rather than by rivets or screws.

Moreover, as a variant of the described arrangement, the ignition timing mark means on the support ring which may, in addition, be a separate part, may also be disposed or formed on the section of the axial remote from the end thereof; this section may also be the larger diameter section of the axial whether or not in conjunction with the foregoing variant.

Finally, the field of application of the invention is not limited to that of single clutches comprising only a single pressure plate and a single clutch plate, but covers multiple clutches which have two or more pressure plates and two or more clutch plates such as dual clutches in particular.

What we claim is:

1. In a clutch for a motor vehicle including a starter ring gear and ignition timing mark means, the improvement comprising a single annular support ring carrying both said starter ring gear and said ignition timing mark means adapted to be fixed relative to a reaction plate for the clutch, said annular support ring comprising an inner peripheral radial portion and an outer peripheral axial portion, and a connecting zone between said radial and axial portions, said axial portion of said support ring comprising two separate axial sections radially offset relative to each other, one of said axial sections carrying said starter ring gear and the other of said axial sections carrying said ignition timing mark means.

2. The clutch according to claim 1, wherein due to said radial offset one of said axial sections has a diameter greater than the other of said sections, said greater diameter axial section being disposed at an unsupported free end of said axial portion axially remote from said radial portion.

3. The clutch according to claim 1, wherein said starter ring gear is defined by a separate component secured to said support ring by a weld, said weld extending along the side of said starter ring gear axially remote from said ignition timing mark means.

4. The clutch according to claim 1, wherein said ignition timing mark means forms an integral part of said support ring.

5. The clutch according to claim 4, wherein said ignition timing mark means comprises a plurality of teeth defined by deformations in a wall portion of said support ring.

6. The clutch according to claim 1, wherein said connecting zone between said radial and axial portions is oblique with respect to the axis of said clutch and makes an angle less than 90° therewith.

7. The clutch according to claim 1, wherein said axial portion is generally axially aligned with and radially spaced from the outer periphery of said reaction plate.

8. The clutch according to claim 1, wherein said starter ring gear is disposed on that one of said axial sections disposed adjacent said connecting zone.

* * * * *